July 11, 1939.                C. W. FREDERICK ET AL                2,165,365
                              LENS ATTACHMENT
                 Filed Nov. 19, 1937          2 Sheets—Sheet 1

FIG. 1                                               PRIOR ART f/4.5                                        Back Focus = 89.6 mm.

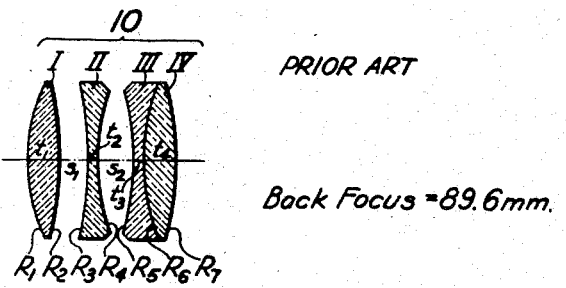

| LENS | GLASS | RADII | SPACINGS | FOCAL LENGTH | |
|------|-------|-------|----------|--------------|---|
|      |       |       |          | PARAXIAL | f/6.3 |
| I | $N_D = 1.6109$ $\nu = 57.2$ | $R_1 = +28.1$ mm. $R_2 = -217.9$ mm. | $t_1 = 4.23$ mm. $s_1 = 3.94$ mm. | $F_G = 99.87$ | 99.53 |
| II | $N_D = 1.5750$ $\nu = 42.7$ | $R_3 = -47.7$ mm. $R_4 = +25.7$ mm. | $t_2 = 1.21$ mm. $s_2 = 7.26$ mm. | $F_F = 99.87$ $F_D = 100.00$ | 99.42 99.41 |
| III | $N_D = 1.5230$ $\nu = 50.5$ | $R_5 = -91.1$ mm. $R_6 = +28.0$ mm. | $t_3 = 1.21$ mm. $t_4 = 4.39$ mm. | $F_C = 100.11$ | 99.50 |
| IV | $N_D = 1.6109$ $\nu = 57.2$ | $R_7 = -32.5$ mm. |  | $F_A = 100.32$ | 99.65 |

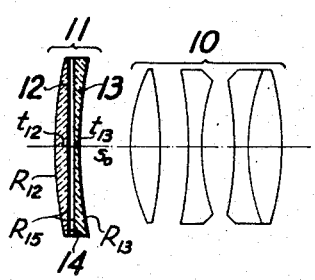

FIG. 2

| LENS | GLASS | RADII | SPACINGS |
|------|-------|-------|----------|
| 12 | $N_D = 1.5230$ $\nu = 58.4$ | $R_{12} = +656.0$ mm. $R_{15} = \infty$ | $t_{12} = 2.3$ mm. $t_{13} = 2.3$ mm. |
| 13 | $N_D = 1.6168$ $\nu = 36.6$ | $R_{13} = +771.0$ mm. | $s_0 = 2.8$ mm. |

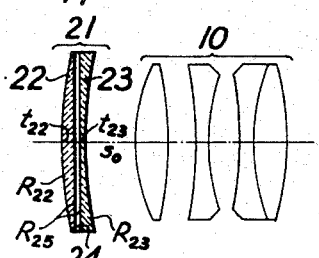

FIG. 3

| LENS | GLASS | RADII | SPACINGS |
|------|-------|-------|----------|
| 22 | $N_D = 1.5230$ $\nu = 58.4$ | $R_{22} = +298.1$ mm. $R_{25} = \infty$ | $t_{22} = 2.3$ mm. $t_{23} = 2.3$ mm. |
| 23 | $N_D = 1.6168$ $\nu = 36.6$ | $R_{23} = +349.5$ mm. | $s_0 = 2.8$ mm. |

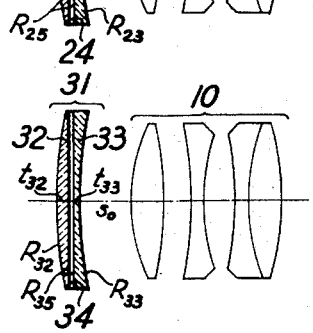

FIG. 4

| LENS | GLASS | RADII | SPACINGS |
|------|-------|-------|----------|
| 32 | $N_D = 1.5230$ $\nu = 58.4$ | $R_{32} = +164.0$ mm. $R_{35} = \infty$ | $t_{32} = 2.3$ mm. $t_{33} = 2.3$ mm. |
| 33 | $N_D = 1.6168$ $\nu = 36.6$ | $R_{33} = +191.3$ mm. | $s_0 = 2.8$ mm. |

Charles W. Frederick
Willy Schade
INVENTORS

BY  *Newton M. Pernul*
    *Rolla N. Carter*
ATTORNEYS

July 11, 1939.  C. W. FREDERICK ET AL  2,165,365
LENS ATTACHMENT
Filed Nov. 19, 1937  2 Sheets-Sheet 2
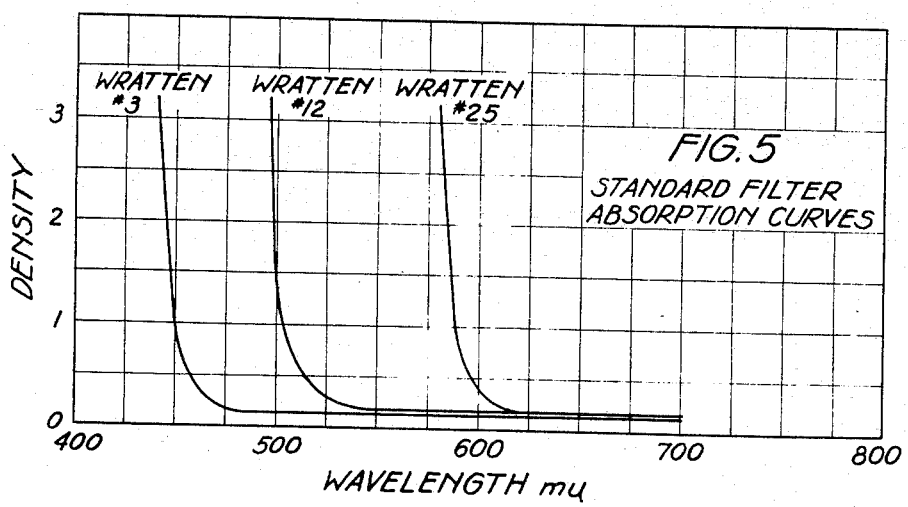
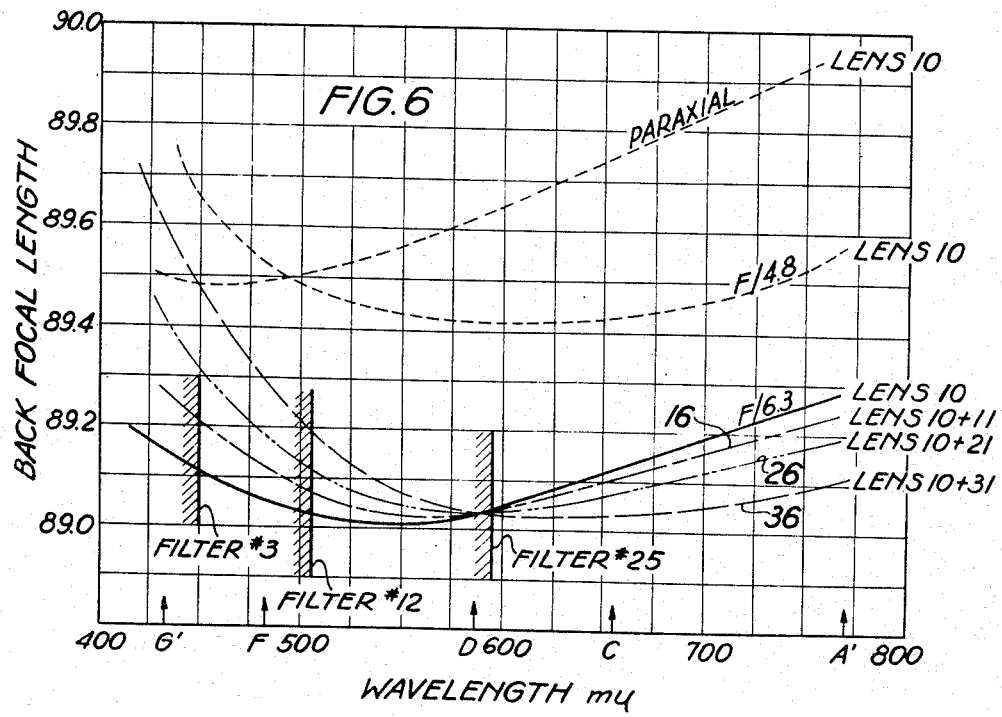
Charles W. Frederick
Willy Schade
INVENTORS
BY
ATTORNEYS Patented July 11, 1939

2,165,365

UNITED STATES PATENT OFFICE 2,165,365

LENS ATTACHMENT

Charles W. Frederick and Willy Schade, Rochester, N. Y., assignors to Eastman Kodak Company, Rochester, N. Y., a corporation of New Jersey Application November 19, 1937, Serial No. 175,472

6 Claims. (Cl. 88—57)

This invention relates to lens attachments and particularly to color filters suitable for photographic purposes.

It is an object of the invention to provide an optical system including a filter transmitting a known spectrum portion, which system is more highly achromatized throughout said spectrum portion than hitherto.

It is a special object of the invention to provide a light filter attachment adapted for use with an objective having at least secondary color aberration, which attachment cooperates with the objective to reduce the color aberration (which is usually only secondary color) throughout the spectrum region transmitted by the filter.

Color filters are usually made of glass, gelatin, gelatin cemented between glass or similar materials. The exact color of a given filter cannot be described conveniently and exactly without the use of graphs and hence it is customary in the literature to refer to various filters by their code numbers, the absorption curves for which are given in "Wratten Light Filters," published by the Eastman Kodak Company, Rochester, New York, or similar booklets. The absorption curves are given in the accompanying drawings for the three typical examples specifically considered herebelow.

According to the invention, a light filter attachment transmitting a portion of the spectrum and adapted for use with an objective having at least secondary color aberration, includes lens means for reducing this color aberration throughout said spectrum portion. In general, this advantage is gained at the expense of considerable increase in chromatic aberration in the spectral regions absorbed by the filter, which regions are, of course, of no interest or importance when the filter is used.

More specifically, the invention provides a light filter attachment made of glass or gelatin cemented between glass and having at least two lens elements of different glasses arranged so that the attachment has zero power for one wave length, negative power for all colors on one side of this wave length and positive power for the remainder of the spectrum. Throughout this specification the whole spectrum is meant to include only those portions of the ultra-violet, visible, and infrared regions for which photographic emulsions can be made sensitive and for which photographic objectives are designed. It is desirable that the wave length for which the attachment has zero power be in the region for which the camera is critically focused; the "D line" is the wave length for which the details given below have been calculated.

One of the lens elements may be made of the filter material if desired or the filter may be cemented between two clear glass elements. Other objects and advantages of the present invention will be apparent from the following description when read in connection with the accompanying drawings in which:

Fig. 1 shows a well-known type of objective.

Figs. 2, 3, and 4 show lens attachments made according to the invention adapted for use with the objective shown in Fig. 1.

Fig. 5 shows the absorption curves for three light filters commonly used in aerial photography.

Fig. 6 illustrates graphically the effect of the invention, particularly the embodiments shown in Figs. 2, 3, and 4.

The invention is applicable to almost every known type of photographic objective. The one shown in Fig. 1 is considered only as a typical example, but the invention is not restricted to any particular type. This objective 10 has the following specifications:

f/4.5     F=100 mm.     Back focus=89.6 mm.

| Lens | Glass | Radii | Spacings | Focal length | | |
|------|-------|-------|----------|--------------|--|--|
|      |       |       |          | Color | Paraxial | f/6.3 |
|      |       | *Mm.* | *Mm.*    |       | *Mm.* | *Mm.* |
| I    | $N_D$=1.6109 $V$=57.2 | $R_1$=28.1 $R_2$=217.9 | $t_1$=4.23 $S_1$=3.94 | G' | 99.87 | 99.53 |
| II   | $N_D$=1.5750 $V$=42.7 | $R_3$=47.7 $R_4$=25.7 | $t_2$=1.21 $S_2$=7.26 | F | 99.87 | 99.42 |
|      |       |       |          | D | 100.00 | 99.41 |
| III  | $N_D$=1.5230 $V$=50.5 | $R_5$=91.1 $R_6$=28.0 | $t_3$=1.21 | C | 100.11 | 99.50 |
| IV   | $N_D$=1.6109 $V$=57.2 | $R_7$=32.5 | $t_4$=4.39 | A | 100.32 | 99.65 |

From the last two columns in the above table it will be noticed that the chromatic aberration and the spherical aberration are both small and that the lens 10 has been achromatized for the F and the D lines at the f/6.3 zone. The curves of the back focal length against wave length of light for the paraxial f/6.3 and f/4.8 zones of this lens 10 are shown in Fig. 6. The aberrations measurable as vertical differences are quite apparent from this chart in which the ordinate scale is greatly magnified. The present invention is concerned with the correction of the residual secondary color, i. e. the amount by which these focal length curves differ from horizontal straight lines, particularly the f/6.3, although all zones will be affected in a similar manner.

In Fig. 2, the objective 10 is provided with an attachment 11 made according to the invention. This attachment 11 consists of two lens elements 12 and 13, the inner surfaces R15 of which are plano and between which is cemented a color filter 14. The outer surfaces R12 and R13 of the elements 12 and 13 are curved to shift the achromatism of the objective 10 toward the red end of the spectrum as shown by the broken curve 16 in Fig. 6. The filter 14 comprises a light absorbing medium known as "Wratten No. 3" or "Wratten aero 1," the curve of which is shown in Fig. 5.

Similarly, in Figs. 3 and 4, lens attachments 21 and 31 according to the invention are made up for "Wratten filter #12" and "Wratten filter #25" respectively. It will be noted that stronger refractive curvatures are employed in the cases where the invention is applied to red filters (e. g. #25) rather than light yellow filters such as #3.

The attachments have the following specifications:

| Attachment 11 | | Wratten filter #3 | |
|---|---|---|---|
| Lens | Glass | Radii | Spacings |
| | | Mm. | Mm. |
| 12 | $N_D=1.5230$ | $R_{12}=+656.0$ | $t_{12}=2.3$ |
| | $V=58.4$ | $R_{15}=\infty$ | $t_{13}=2.3$ |
| 13 | $N_D=1.6168$ | $R_{13}=+771.0$ | $S_0=2.8$ |
| | $V=36.6$ | | |

| Attachment 21 | | Wratten filter #12 | |
|---|---|---|---|
| Lens | Glass | Radii | Spacings |
| | | Mm. | Mm. |
| 22 | $N_D=1.5230$ | $R_{22}=+298.1$ | $t_{22}=2.3$ |
| | $V=58.4$ | $R_{25}=\infty$ | $t_{23}=2.3$ |
| 23 | $N_D=1.6168$ | $R_{23}=+349.5$ | $S_0=2.8$ |
| | $V=36.6$ | | |

| Attachment 31 | | Wratten filter #25 | |
|---|---|---|---|
| Lens | Glass | Radii | Spacings |
| | | Mm. | Mm. |
| 32 | $N_D=1.5230$ | $R_{32}=+164.0$ | $t_{32}=2.3$ |
| | $V=58.4$ | $R_{34}=\infty$ | $t_{33}=2.3$ |
| 33 | $N_D=1.6168$ | $R_{33}=+191.3$ | $S_0=2.8$ |
| | $V=36.6$ | | |

In Fig. 6, the curves 16, 26 and 36 are for the f/6.3 zone, but it is obvious that similar beneficial effects will be obtained in the paraxial, f/4.8 and other zones.

Considering only the f/6.3 zone, it will be noticed that the effect of the lens attachment 11, 21 or 31 is to reduce the focal length of the lens system for all wave lengths longer than that of the "D line" and to increase the focal length for the shorter wave lengths. This latter increase goes beyond the tolerance limits for wave lengths shorter than 450 millimicrons in the case of attachment 11, but between this wave length and the long wave length limit, say 800 millimicrons, the chromatic aberration is reduced to .2 mm. in focal length.

The effect is even more apparent with attachments 21 and 31 wherein the invention is applied to Wratten filters #12 and #25. From Fig. 6, it is seen that attachment 21 reduces the chromatic aberration to 0.15 mm. from 500–800 millimicrons, which is the spectral region transmitted by this attachment. Similarly, attachment 31 reduces the chromatic aberration to 0.07 throughout its transmission range 600–800 millimicrons.

For infra-red work, the invention is particularly useful, since the attachment may be arranged so that when the objective 10 is visually focused (for the D line say), the addition of the filter attachment corrects the infra-red focus so that not only is the chromatic aberration throughout the transmitted spectral region reduced, but the system is in correct focus for this region (infra-red).

The lens attachments 11, 21 and 31 all have zero power, i. e., infinite focal length, for the D line. This is quite apparent from Fig. 5. For longer wave lengths, these attachments have very weak positive power, i. e., very long positive focal length. For shorter wave lengths, the converse is true, i. e., the attachment has very weak negative power; very long negative focal length.

Having thus described the preferred embodiment of our invention and three specific examples particularly useful in aerial photography, we wish to point out that it is not limited to these specific arrangements, but is of the scope of the appended claims.

We claim:
1. An optical system comprising in axial alignment an achromatic objective having secondary color, a light filter transmitting a limited portion of the spectrum and lens means having chromatic aberration at least in the region of said objective's achromatism whereby the combination of said lens means and said objective has a region of achromatism different from that of the objective alone, said chromatic aberration having such numerical value that said region of achromatism of the combination approximates said limited portion of the spectrum transmitted by the filter, whereby throughout this limited portion of the spectrum, the combination has less chromatic aberration than the objective alone.

2. A lens attachment adapted for use with an ordinary achromatic objective having secondary color and a minimum focal length for one wavelength, said attachment comprising a light filter transmitting a limited portion of the spectrum at least slightly different from the region of achromatism of said objective and lens means in axial alignment with the filter, said lens means being made up of at least two different kinds of glass and having chromatic aberration so that its power changes with wavelength continuously at the wavelength for which the objective has a minimum focal length, the rate of change in power having a value which together with the achromatism of the objective is equivalent to achromatism in a spectral region approximating the limited portion of the spectrum transmitted by the filter whereby throughout said limited portion of the spectrum the combination has less chromatic aberration than the objective alone.

3. A lens attachment adapted for use with an objective having at least secondary color aberration, comprising a light filter transmitting a limited portion of the spectrum, a mount for the filter and lens means secured to the mount in axial alignment with the filter for reducing the color aberration of the objective in said spectrum portion, said lens means including at least two elements of different glasses and having zero power for one wave length only, said wave length being included in said limited portion.

4. A lens attachment adapted for use with an objective having at least secondary color aberration, comprising a light filter transmitting a relatively long wave length portion of the spectrum, a mount for the filter and lens means secured to the mount in axial alignment with the filter for reducing the color aberration of the objective in said spectrum portion, said lens means including at least two elements of different glasses and having zero power for one wave length, negative power for all wave lengths shorter than this and positive power for all longer wave lengths.

5. A lens attachment adapted for use with an achromatic objective having secondary color, comprising a plurality of lens elements in axial alignment at least one of which consists of a light filter material transmitting a limited portion of the spectrum, the sum of the powers of the elements being zero for one wave length only, said wave length being included in said limited portion, whereby the amount of said secondary color in said spectrum portion will be affected.

6. In combination, an achromatic objective having secondary color such that for one color within the useful spectrum the mathematical differential of the focal length with respect to wavelength is zero, the focal length being a maximum or a minimum at that one color and a lens attachment in axial alignment with the objective, said attachment having a focal length which in the region of said one color changes with wavelength continuously by a relatively small amount, the combination having a focal length differential with respect to wavelength only slightly different from that of the objective alone, the zero value of the differential of the combination being also within the useful spectrum.

CHARLES W. FREDERICK.
WILLY SCHADE.